Sept. 21, 1926.

W. D. SCZAWINSKI

CHUCK

Filed Feb. 12, 1925

INVENTOR
Walter D. Sczawinski
BY
H. G. Manning
ATTORNEY

Sept. 21, 1926.
W. D. SCZAWINSKI
CHUCK
Filed Feb. 12, 1925
1,600,367
2 Sheets-Sheet 2
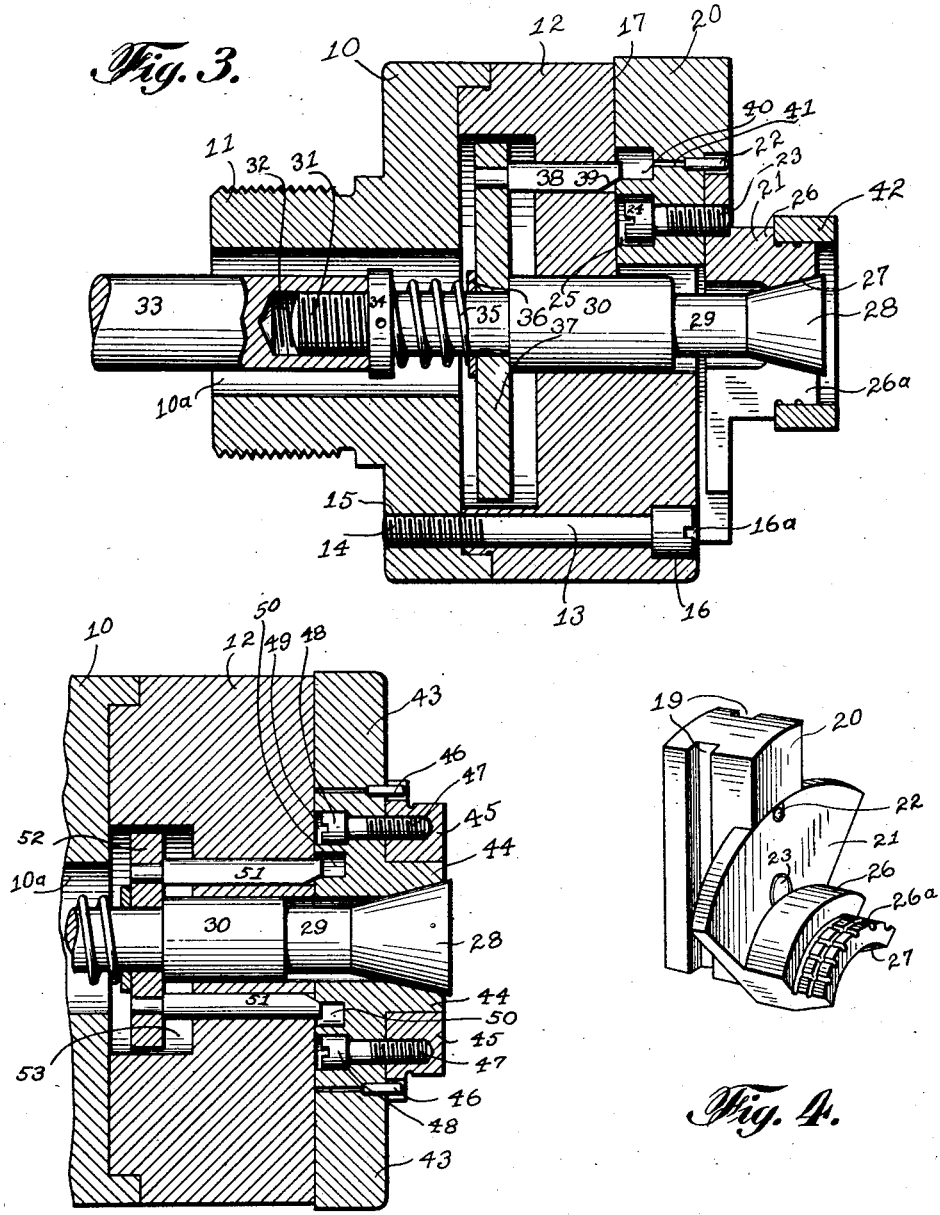
INVENTOR
Walter D. Sczawinski
BY H. G. Manning
ATTORNEY Patented Sept. 21, 1926.

1,600,367

UNITED STATES PATENT OFFICE.

WALTER D. SCZAWINSKI, OF NEW BRITAIN, CONNECTICUT.

CHUCK.

Application filed February 12, 1925. Serial No. 8,708.

This invention relates to chucks, and more particularly to a chuck for supporting annular bearing rings, cylinders, and other hollow articles for machining, grinding, polishing, or finishing on a lathe.

A further object is to provide a chuck of the above nature having a fluid-operated plunger which is maintained in work-holding position by fluid pressure, and is forced out of said position by a spring when the fluid pressure is shut off.

A further object is to provide a chuck of the above nature having a series of radially movable jaws adapted to move inwardly to permit the hollow article to be removed from the chuck when the work is completed, said jaws having detachable pads which may be replaced by other pads to accommodate various sizes of articles.

A further object is to provide a chuck of the above nature which will be relatively simple in construction, inexpensive to manufacture, easy to install and manipulate, compact in size, and very efficient and durable in use.

With these and other objects in view, there have been illustrated on the accompanying drawings, two forms in which the invention may be conveniently embodied in practice.

Fig. 3 is a sectional view taken on the broken line 3—3 of Fig. 2, looking in the direction of the arrows.

Fig. 4 is a perspective view of one of the movable jaws with its detachable chuck pad.

Fig. 5 is a sectional view of a modified form of chuck also embodying the invention.

Figure 1:
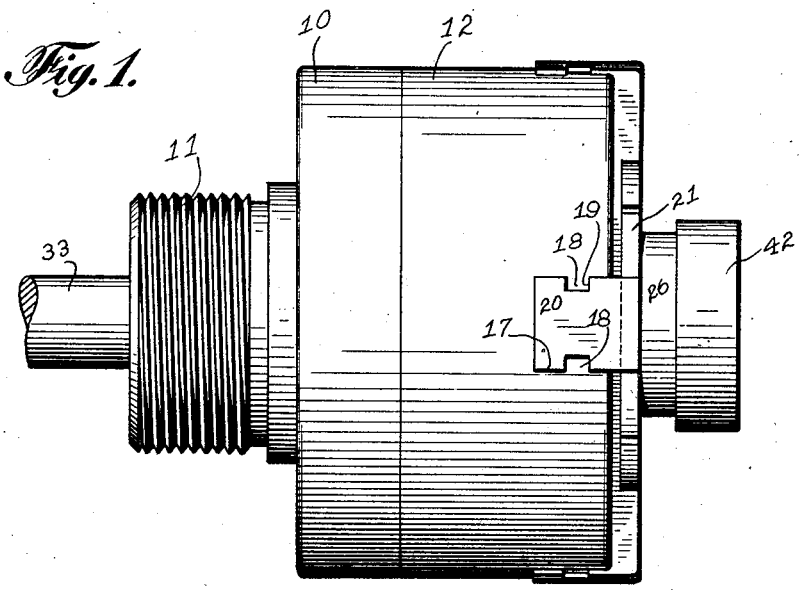
Fig. 1 represents a top view of the first form of chuck.

Referring now to the drawings in which like reference numerals denote corresponding parts throughout the several views, the numeral 10 indicates the body member of the chuck, said member 10 having a central bore 10ª and a reduced rear threaded portion 11 adapted to be screwed into the head stock of a lathe. The body member 10 is interfitted with a jaw-supporting member 12, to which it is firmly clamped by a plurality of securing bolts 13, four in number in this instance. The bolts 13 are threaded at their rear ends 14 for engagement in tapped holes 15, and said bolts have slotted heads 16 at their forward ends, said heads being seated in recesses 16ª, as clearly shown in Fig. 3.

The jaw-supporting member 12 is provided with four radially disposed guideways 17, each of said guide-ways having a pair of oppositely alined tongues 18 adapted to engage into a pair of grooves 19 of a chuck jaw 20 slidably mounted in said guide-way. Each of the chuck jaws 20 is provided with a chuck pad member comprising an arcuate vertical plate section 21 which is secured in alinement with said jaw 20 by an alining pin 22. Each of the chuck pad members is locked to its respective chuck jaw by a screw 23 having a head 24 fitted in a recess 25 in the rear of said chuck jaw 20.

Each of the chuck pads is also provided with a pair of stepped arcuate sections 26 and 26ª disposed at right angles to the plate section 21. The section 26ª is smaller in diameter than the section 26 and is corrugated to form a firm gripping surface. The chuck pad gripping sections 26ª are tapered conically on their inner surfaces 27, and said surfaces 27 are adapted to be engaged by an outwardly tapered wedge cone 28 formed on the front end of a fluid pressure operated plunger 29. The plunger 29 has an enlarged intermediate portion 30 which slides within an aperture in the center of the jaw-supporting member 12. The rear of the plunger 29 is threaded at 31 and is screwed into a tapped hole 32 at the forward end of an operating shaft 33 which transmits power from a fluid pressure operated mechanism, not shown.

The plunger 29 is provided adjacent its threaded portion 31 with an enlarged flange 34 forming a seat for a spiral spring 35 surrounding said plunger, said spring engaging a washer 36 which in turn engages an enlarged perforated circular disc 37. The disc 37 is provided near its periphery with a series of wedge pins 38 having inclined forward inner edges 39 adapted to engage in wedge fashion against the inner edges of a series of recesses 40 located in the rear of the alining pins 22, which are connected with said recesses by small passages 41. Any convenient means are also provided to return the plunger to the right when the power is shut off, as viewed in Fig. 3.

Figure 2:
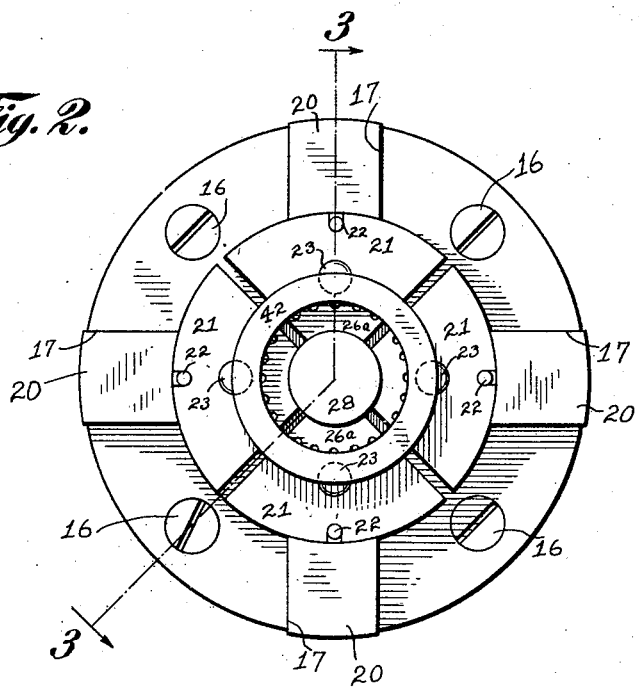
Fig. 2 is a front view of the same.

In the operation of the chuck shown in Figs. 1 to 4, assuming the jaws to be in collapsed position, the hollow article to be machined, such as a hollow anti-friction bearing 42, is first brought into a position surrounding the chuck pad gripping sections 26ᵃ. The fluid pressure is then turned on, causing the shaft 33 to pull the plunger 29 rearwardly (to the left as shown on Fig. 3) and causing the wedge cone 28 to spread the movable chuck jaws 20 outwardly, thereby causing the chuck pads to firmly grip the interior of the hollow article.

When the article is ready to be removed from the chuck, the fluid pressure will be shut off The wedge pins 38 will at this time be forced clear into the recesses 40, by the pressure of the spring 35 on the disc 37, thereby causing the chuck jaws to move inwardly. This operation will release the hollow article which may be then readily replaced with a new article to be worked upon in the lathe.

The modified form of chuck shown in Fig. 5 is especially adapted for heavy work. In this form, instead of forming the chuck jaws in two parts, as in the form shown in Figs. 1 to 4, each of said jaws is made unitary and consists of an outer radially extending portion 43, and an inner longitudinally extending cone engaging portion 44. With this form of chuck, the work is adapted to be gripped by a series of outer gripping members 45, one of which is secured on the exterior of each of said cone-engaging portions 44. The members 45 are held in alinement with the radially extending portions 43 of the jaws by alining pins 46, and each of said members is adapted to be locked in place by a screw 47, having a head 48 seated in a recess 49 in the rear of said chuck jaw. Wedge recesses 50 are also employed in this modification, and are adapted to receive wedge pins 51, secured to the disc 52 located within the recess 53, said disc, however, being of much smaller diameter than the disc 37 shown in Fig. 3.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a chuck for holding a hollow annular article, a body, a plurality of collapsible radially slidable jaws on said body adapted to grip the inside of said article, said jaws having recesses in their rear sides, a plunger located within said body, operating means for pressing said plunger rearwardly to cause the jaws to move outwardly into gripping engagement with said article, said plunger having a spring-pressed disc mounted thereon, said disc having a plurality of slidable wedge pins adapted to enter the recesses in said jaws to force said jaws inwardly when the fluid pressure is shut off.

2. In a chuck for holding an annular article, a body, a plurality of work-holding jaws slidably mounted in said body, a plunger slidable in said body and adapted to engage said jaws for maintaining them in contact with the inside of the work, and slidable means directly seated in said jaws for automatically and positively holding said jaws in collapsed position when said work has been released.

In testimony whereof, I have affixed my signature to this specification.

WALTER D. SCZAWINSKI.